United States Patent
Grove et al.

(10) Patent No.: US 11,499,485 B2
(45) Date of Patent: Nov. 15, 2022

(54) ENGINE CONTROL DEVICE AND METHODS THEREOF

(71) Applicant: UNITED TECHNOLOGIES CORPORATION, Farmington, CT (US)

(72) Inventors: Donald E. Grove, Cobalt, CT (US); James K. Berry, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/786,758

(22) Filed: Feb. 10, 2020

(65) Prior Publication Data
US 2021/0246838 A1 Aug. 12, 2021

(51) Int. Cl.
F02C 9/26 (2006.01)
F02C 3/24 (2006.01)
F02C 7/22 (2006.01)
F02C 7/232 (2006.01)

(52) U.S. Cl.
CPC .......... *F02C 9/26* (2013.01); *F02C 3/24* (2013.01); *F02C 7/222* (2013.01); *F02C 7/232* (2013.01); *F02C 9/263* (2013.01)

(58) Field of Classification Search
None
See application file for complete search history.

(56) References Cited

U.S. PATENT DOCUMENTS

| 9,128,053 B2* | 9/2015 | Rosen | G01T 1/00 |
| 10,774,620 B2* | 9/2020 | Johnson | E21B 33/0387 |
| 2007/0151333 A1* | 7/2007 | Paradise | G01F 1/86 |
| | | | 73/114.35 |
| 2008/0110593 A1* | 5/2008 | Coney | F01D 25/12 |
| | | | 165/80.2 |
| 2009/0301575 A1* | 12/2009 | Arnett | F02C 7/232 |
| | | | 137/468 |
| 2009/0319153 A1* | 12/2009 | Bradley | F02C 7/22 |
| | | | 701/103 |
| 2011/0264384 A1* | 10/2011 | Boulanger | G01F 15/022 |
| | | | 702/47 |
| 2012/0042657 A1* | 2/2012 | Hodinot | F02C 9/263 |
| | | | 60/772 |

(Continued)

FOREIGN PATENT DOCUMENTS

EP 3059423 8/2016

OTHER PUBLICATIONS

European Patent Office, European Search Report dated Jun. 29, 2021 in Application No. 21155836.6.

*Primary Examiner* — Ehud Gartenberg
*Assistant Examiner* — Jacek Lisowski
(74) *Attorney, Agent, or Firm* — Snell & Wilmer L.L.P.

(57) ABSTRACT

An engine control device may comprise a processor and a memory. The engine control device may be configured to modify a fuel flow based on a density of the fuel proximate a fuel nozzle. The engine control device may include a densimeter embedded in, or disposed proximate, the engine control device. The engine control device may include a temperature sensor embedded in, or disposed proximate, the engine control device. The engine control device may be electrically coupled to a fuel valve and/or configured to modulate the fuel valve based on a density of the fuel at the fuel valve.

11 Claims, 4 Drawing Sheets

(56) References Cited

U.S. PATENT DOCUMENTS

| | | | |
|---|---|---|---|
| 2012/0095663 A1* | 4/2012 | Roy | F02C 9/48 |
| | | | 701/100 |
| 2012/0166110 A1 | 6/2012 | Wilson | |
| 2013/0213053 A1* | 8/2013 | Gaully | F02C 7/232 |
| | | | 60/776 |
| 2015/0284105 A1 | 10/2015 | McCarthy et al. | |
| 2016/0177860 A1 | 6/2016 | Pursifull et al. | |
| 2018/0164201 A1 | 6/2018 | Zimmer et al. | |

* cited by examiner

ENGINE CONTROL DEVICE AND METHODS THEREOF

FIELD

The present disclosure relates to gas turbine engines, and, more specifically, to engine control devices and methods thereof for a gas turbine engine.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads. Gas turbine engines may include fuel having variation in fuel density from batch to batch. Variation in fuel density may contribute to fuel flow inaccuracy in metering fuel to the combustor section.

SUMMARY

An engine control device is disclosed herein. The engine control device may comprise: a housing; a fluid conduit disposed through the housing, the fluid conduit configured to receive fuel during operation of the engine control device; and a densimeter operably coupled to the fluid conduit, the densimeter being disposed in the housing and configured to determine a density of the fuel.

In various embodiments, the engine control device is configured to control a fuel flow to a fuel nozzle based on measurements from the densimeter. The engine control device may further comprise: a temperature sensor operably coupled to the fluid conduit to measure a temperature of the fuel; a processor; and a non-transitory computer readable storage medium in electronic communication with the processor, the non-transitory computer readable storage medium having instructions stored thereon that, in response to execution by the processor cause the processor to perform operations comprising: detecting, by the processor, a first temperature of the fuel flowing through the fluid conduit from the temperature sensor; detecting, by the processor, a first density of the fuel at the first temperature from the densimeter; calculating, by the processor, a second density at a second temperature; and modifying, by the processor, a fuel flow to a fuel nozzle of a gas-turbine engine based on the second density. The operations may further comprise detecting, by the processor, the second temperature of the fuel at a fuel valve assembly. The operations may further comprise detecting, by the processor, the second temperature at the fuel valve assembly. The fluid conduit may include an inlet port and an outlet port. The inlet port may be disposed at a first end of the fluid conduit and the outlet port may be disposed at a second end of the fluid conduit.

A fuel flow control system for a gas turbine engine is disclosed herein. The fuel flow control system may comprise: a fuel supply; a fluid conduit in fluid communication with the fuel supply; an engine control device in fluid communication with the fuel supply; a densimeter operably coupled to the fluid conduit; a first temperature sensor operably coupled to the fluid conduit; a fuel nozzle in fluid communication with the fuel supply; and a second temperature sensor disposed between the fuel nozzle and the fuel supply.

In various embodiments, the engine control device may be configured to control a fuel flow to the fuel nozzle based on measurements from the densimeter, the first temperature sensor, and the second temperature sensor. The densimeter may be embedded in the engine control device. The fluid conduit may be disposed through the engine control device. The fluid conduit may be disposed between the fuel supply and the engine control device. The densimeter may be electrically coupled to the engine control device. The fuel flow control system may further comprise a fuel valve assembly, wherein the second temperature sensor is disposed in the fuel valve assembly. The fuel valve assembly may include a fuel valve electrically coupled to the engine control device. The engine control device may be configured to modulate the fuel valve based on measurements of the first temperature sensor, the second temperature sensor, and the densimeter. Fuel from the fuel supply may be configured to cool the engine control device during operation of the gas turbine engine.

A method of controlling a fuel flow in a gas turbine engine, the method comprising: measuring a first fuel temperature at a first location; measuring a first fuel density at the first location; measuring a second fuel temperature at a second location; calculating a second fuel density at the second location based on the second fuel temperature, the first fuel temperature, and the first fuel density; and modifying the fuel flow at the second location in response to calculating the second fuel density.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

A fuel flow control system is disclosed herein. The fuel flow control system may comprise an engine control device configured to control a fuel flow of a gas-turbine engine. The engine control device may include a conduit disposed therethrough. Fuel may flow through the conduit during normal operation of the gas-turbine engine. The conduit may be coupled to a densimeter. The densimeter may be configured to measure a density of the fuel flowing therethrough. The densimeter may be disposed in the engine control device or proximate the engine control device. The fuel flow control system may further comprise a fuel valve assembly. The fuel valve assembly may comprise a fuel valve and a fuel exit temperature sensor in electrical communication with the engine control device. The engine control device may be configured to control the fuel flow at the fuel valve in response to measuring a fuel temperature and fuel density at or proximate the engine control device and correcting for fuel temperature at the fuel valve assembly. In this regard, the fuel flow control system may accurately enable better control of fuel burn and/or thrust relative to typical fuel flow control systems, in accordance with various embodiments.

Figure 1:
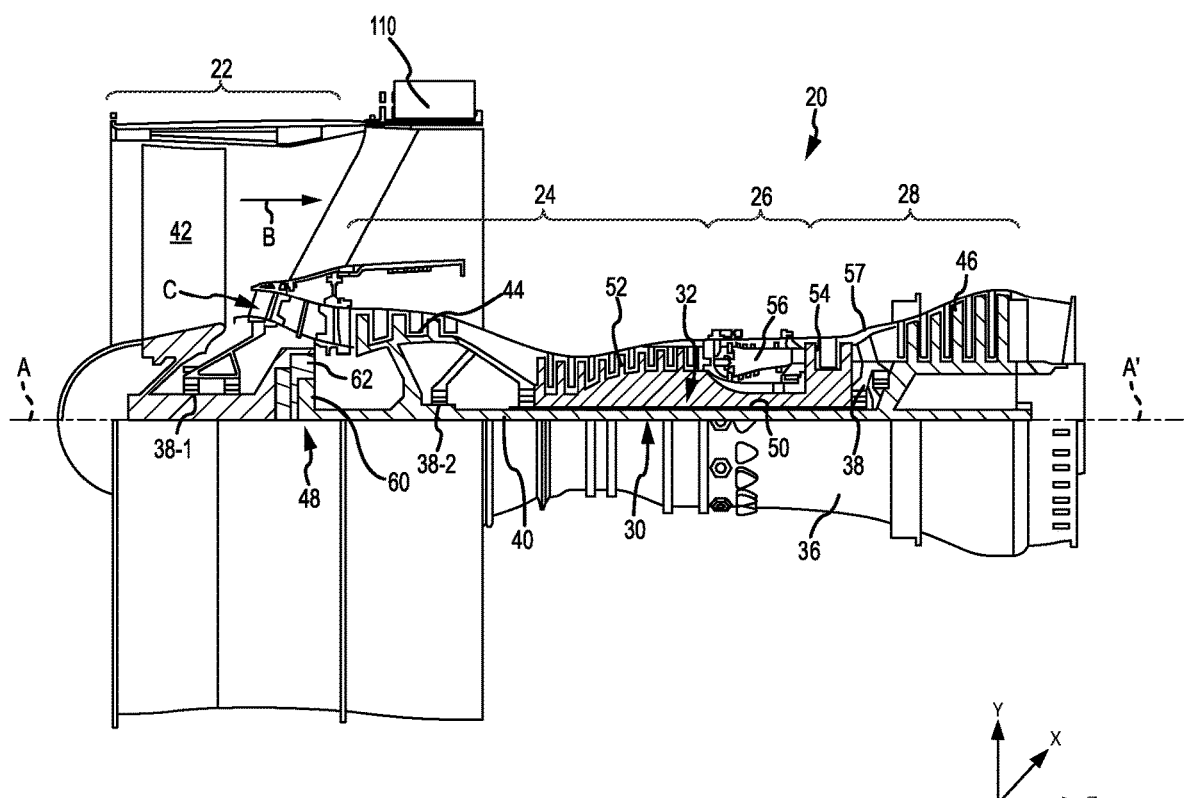
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may generally include a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted concentrically, via bearing systems 38, for rotation about for rotation about engine central longitudinal axis A-A' and relative to an engine static structure 36. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the term "radially" refer to directions towards and away from engine central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine. The airflow in core flow-path C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

The compressor section 24, the combustor section 26, and the turbine section 28 are generally referred to as the engine core. Air is drawn into gas turbine engine 20 through fan 42. Air exiting fan 42 may be divided between core flow-path C and bypass flow-path B. The airflow in bypass flow-path B may be utilized for multiple purposes including, for example, cooling and pressurization.

In various embodiments, the gas turbine engine 20 further comprises an engine control device 110. The engine control device 110 may comprise a full authority digital engine control (FADEC) system or an electronic engine control (EEC) system, or the like. The engine control device 110 may be mounted to a fan section 22, any engine environment between −70° F. (−57° C.) degree F. and 190° F. (88° C.), or the like. The engine control device 110 may be configured to control and/or meter a flow volume, a flow rate, or the like of the fuel at a fuel valve in fluid communication with a fuel nozzle in combustor section 26.

Figure 2:
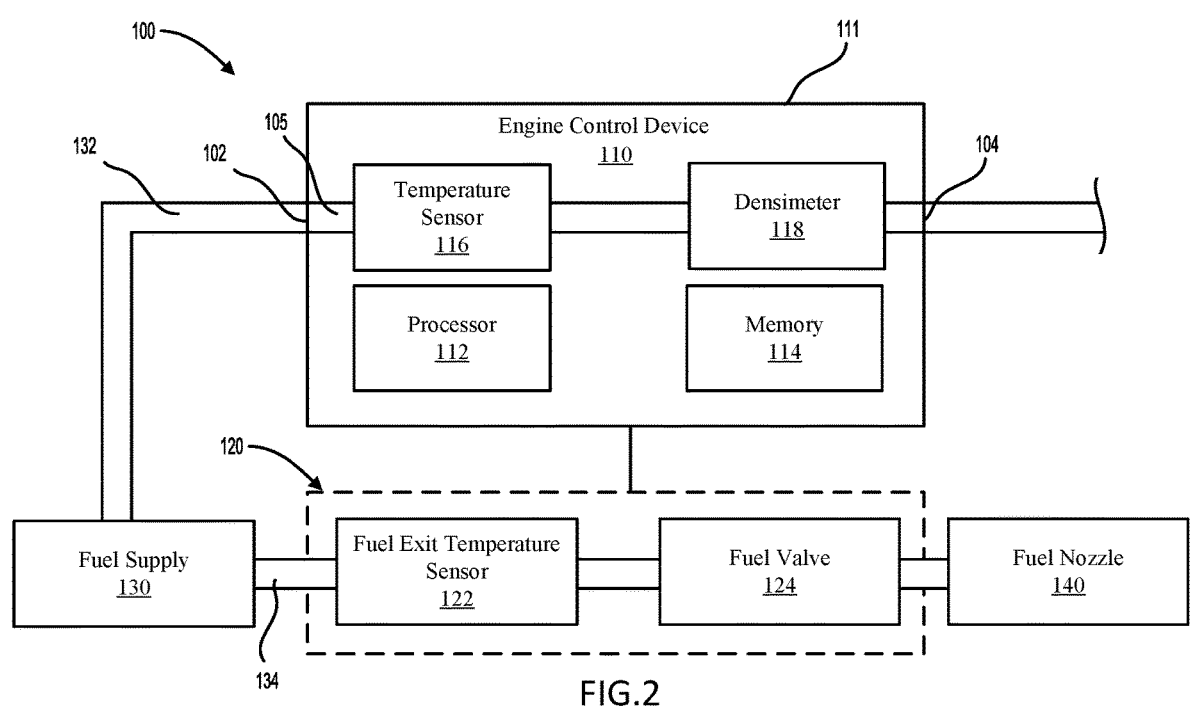
FIG. 2 illustrates a schematic view of a fuel flow control system, in accordance with various embodiments.

Referring now to FIG. 2, a fuel flow control system 100, in accordance with various embodiments, is illustrated. The fuel flow control system 100 includes an engine control device 110 and a fuel valve assembly 120. The engine control device 110 may comprise a processor 112, a memory 114, a temperature sensor 116, and a densimeter 118. The processor 112 may include one or more processors and/or one or more non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Memory 114 may comprise an article of manufacture including a non-transitory computer-readable storage medium having instructions stored thereon that, in response to execution by the computing device (e.g., processor 112), cause the computing device to perform various methods, as discussed further herein.

In various embodiments, the processor 112 may comprise a processor configured to implement various logical operations in response to execution of instructions, for example, instructions stored on a non-transitory computer-readable medium. As used herein, the term "non-transitory" is to be understood to remove only propagating transitory signals per se from the claim scope and does not relinquish rights to all standard computer-readable media that are not only propagating transitory signals per se.

In various embodiments, the processor 112 may be configured to control the fuel flow control system 100. For example, processor 112 may be configured to transfer a control signal to the fuel valve assembly 120 to control a fuel volume, fuel flow rate, or the like at fuel valve assembly 120.

In various embodiments, the temperature sensor 116 may include one or more of a negative temperature coefficient (NTC) thermistor, a resistance temperature detector (RTD), a thermocouple, a semi-conductor based sensor, or the like. In various embodiments, the densimeter 118 may include one or more of a Coriolis densimeter, an ultrasound densimeter, a microwave densimeter, a gravitic densimeter, or the like.

In various embodiments, the engine control device 110 may further comprise a fluid conduit 105 and a housing 111. The fluid conduit 105 may be disposed through the housing 111. The temperature sensor 116 and/or the densimeter 118 may be embedded in the housing 111. The fluid conduit 105 may be configured to allow fuel flow therethrough. The fuel flowing through fluid conduit 105 may be configured to cool the engine control device 110 during operation of gas turbine engine 20 from FIG. 1. The fluid conduit 105 may include an inlet port 102 and an outlet port 104. The inlet port 102 may be disposed at a first end of the housing 111 of engine control device 110. The outlet port 104 may be disposed at a second end of the housing 111 of the engine control device 110. The temperature sensor 116 and the densimeter 118 may be operably coupled to the fluid conduit 105. For example, the temperature sensor 116 may be configured to measure a fuel temperature of the fuel flowing through fluid conduit 105 during normal operation. Similarly, the densimeter 118 may be configured to measure and/or calculate a density of the fuel during normal operation. In various embodiments, the densimeter 118 and/or the temperature sensor 116 are embedded in engine control device 110. In this regard, there will be no (or reduced) external electrical connections and/or fewer components in a fuel flow control system 100.

In various embodiments, the engine control device 110 is electrically coupled to a fuel exit temperature sensor 122 and a fuel valve 124 of the fuel valve assembly 120. The fuel valve assembly 120 may be disposed in combustor section 56 of FIG. 1 proximate fuel nozzles, or the like. Fuel exit temperature sensor 122 may be configured to measure a fuel temperature at fuel valve assembly 120 and communicate the fuel temperature at fuel valve assembly 120 to the engine control device 110. The engine control device 110 may be configured to send a control signal to fuel valve 124 to meter the flow of fuel at a desired rate in response to measuring a density and temperature of the fuel in the engine control device 110 and correcting for a density of fuel at the fuel valve assembly based on the fuel temperature at the fuel valve assembly 120. In this regard, a fuel flow rate may be modified based on a density of fuel and/or provide more accurate fuel flow for better control of fuel burn and/or thrust.

In various embodiments, the fuel flow control system 100 may further comprise a fuel supply 130 and a fuel nozzle 140. The fuel supply 130 may be in fluid communication with the engine control device 110 and the fuel valve assembly 120. For example, a fluid conduit 132 may extend from the fuel supply 130 to the inlet port 102 of the engine control device 110. Fluid conduit 132 may be coupled to the inlet port 102 by any method known in the art, such as via adapters, fittings, nuts, or the like. Similarly, a fluid conduit 134 may extend from fuel supply 130 to the fuel valve assembly 120. Fuel valve 124 may meter the flow of fuel from fuel supply 130 to fuel nozzle 140. In various embodiments, fuel valve 124 may comprise a fuel modulating valve, a fuel modulating unit, or the like.

Figure 3:
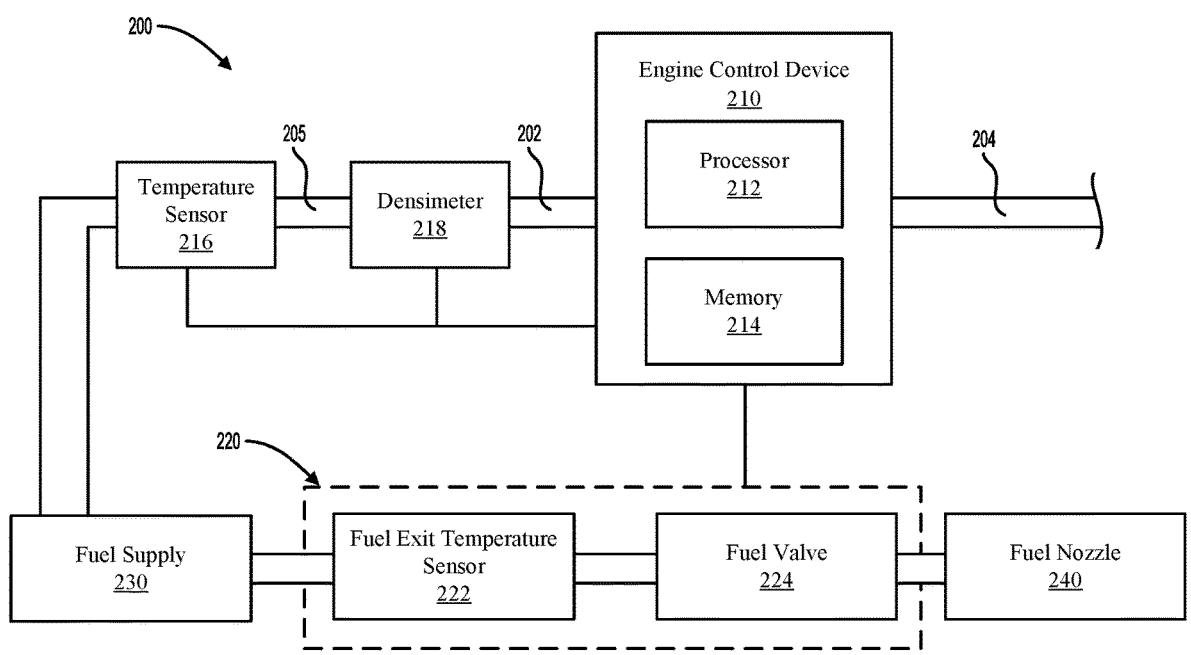
FIG. 3 illustrates a schematic view of a fuel flow control system, in accordance with various embodiments.

Referring now to FIG. 3, a fuel flow control system 200, in accordance with various embodiments, is illustrated. The fuel flow control system 200 includes an engine control device 210 and a fuel valve assembly 120. The engine control device 210 may comprise a processor 212 and a memory 214. The processor 212 may be in accordance with processor 112. Memory 214 may be in accordance with memory 114.

In various embodiments, the processor 212 may be configured to control the fuel flow control system 200. For example, processor 212 may be configured to transfer a control signal to the fuel valve assembly 220 to control a fuel volume, fuel flow rate, or the like at fuel valve assembly 220.

In various embodiments, the engine control device 210 may further comprise a fluid conduit 205 disposed therethrough. The fluid conduit 205 may be configured to allow fuel flow therethrough. The fuel flowing through fluid conduit 205 may be configured to cool the engine control device 210 during operation of gas turbine engine 20 from FIG. 1. The fluid conduit 205 may include an inlet port 202 and an outlet port 204.

In various embodiments, the fuel flow control system 200 may further comprise a temperature sensor 216 and a densimeter 218 disposed proximal the engine control device 210. The temperature sensor 216 and the densimeter 218 may be operably coupled to the fluid conduit 205 external to the engine control device 210. The densimeter 218 and the temperature sensor 216 may be electrically coupled to the engine control device 210. For example, the temperature sensor 216 may be configured to measure a fuel temperature of the fuel flowing through fluid conduit 205 during normal operation. Similarly, the densimeter 118 may be configured to measure and/or calculate a density of the fuel during normal operation. The density data and temperature data of the fuel proximate the engine control device 210 may be provided to the engine control device 210.

In various embodiments, the engine control device 210 is electrically coupled to a fuel exit temperature sensor 222 and a fuel valve 224 of the fuel valve assembly 220. The fuel valve assembly 220 may be disposed in combustor section 56 of FIG. 1 proximate fuel nozzles, or the like. Fuel exit temperature sensor 222 may be configured to measure a fuel temperature at fuel valve assembly 220 and communicate the fuel temperature at fuel valve assembly 220 to the engine control device 210. The engine control device 210 may be configured to send a control signal to fuel valve 224 to meter the flow of fuel at a desired rate in response to measuring a density and temperature of the fuel in the engine control device 210 and correcting for a density of fuel at the fuel valve assembly based on the fuel temperature at the fuel valve assembly 220. In this regard, a fuel flow rate may be modified based on a density of fuel measured by the densimeter 218 and/or provide more accurate fuel flow for better control of fuel burn and/or thrust.

In various embodiments, the fuel flow control system 200 may further comprise a fuel supply 230 and a fuel nozzle 240. The fuel supply 230 may be in fluid communication with the engine control device 210 and the fuel valve assembly 220. Fuel valve 224 may meter the flow of fuel from fuel supply 230 to fuel nozzle 240. In various embodiments, fuel valve 224 may comprise a fuel modulating valve, a fuel modulating unit, or the like.

Figure 4:
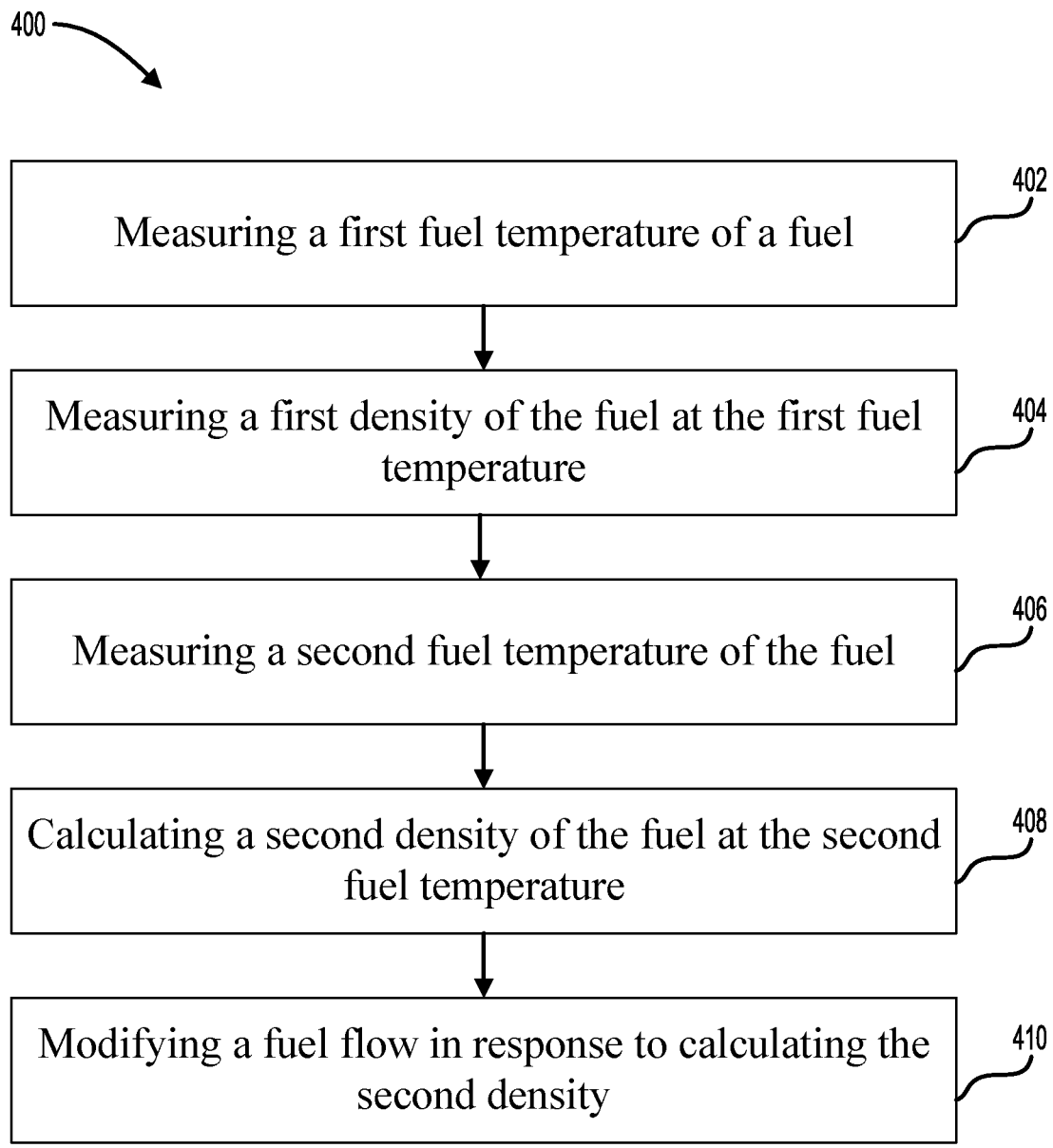
FIG. 4 illustrates a method of controlling fuel flow, in accordance with various embodiments.

Referring now to FIG. 4, a method 400 of controlling a fuel flow of a gas turbine engine is illustrated, in accordance with various embodiments. The method 400 comprises measuring a first fuel temperature of a fuel (step 402). In various embodiments, the first fuel temperature may be measured using a first temperature sensor disposed proximate an engine control device. In various embodiments, the first fuel temperature may be measured using a first temperature sensor disposed in an engine control device. The fuel may be configured to flow through the engine control device. The engine control device may be in fluid communication with a fuel supply. The fuel may be configured to cool the engine control device.

In various embodiments, the method 400 may further comprise measuring a first density of the fuel at the first fuel temperature (step 404). The first density may be measured using a densimeter. The densimeter may be disposed proximate the engine control device, or the densimeter may be embedded in the engine control device. The method 400 may further comprise measuring a second fuel temperature of the fuel (step 406). The second temperature of the fuel may be measured proximate a fuel nozzle in a combustor section. For example, the second temperature may be measured at a fuel valve assembly in fluid communication with the fuel nozzle. The second temperature may be measured via a second temperature sensor disposed in the fuel valve assembly.

In various embodiments, the method may further comprise calculating a second density of the fuel at the second fuel temperature (step 408). Density is inversely proportional to temperature. As such, the second density of the fuel at the second fuel temperature may be calculated based on the first density measured at the first temperature. In this regard, a second density at the fuel valve assembly may be determined based on the first density, the first temperature, and the second temperature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An engine control device for a gas turbine engine, comprising:
   a housing;
   an electronic engine control (EEC) system disposed in the housing of the engine control device, the EEC system configured to control a flow rate by commanding a fuel valve to meter a fuel flow;
   a fluid conduit disposed through the housing and defining an inlet port in the housing and an outlet port in the housing, the fluid conduit configured to receive fuel during operation of the engine control device, the fuel supplied through the fluid conduit to cool the EEC system; and
   a densimeter operably coupled to the fluid conduit, the densimeter embedded within the housing of the engine control device between the inlet port and the outlet port, the densimeter configured to determine a density of the fuel.

2. The engine control device of claim 1, wherein the engine control device is configured to control the fuel flow to a fuel nozzle based on measurements from the densimeter.

3. The engine control device of claim 1, further comprising:
   a temperature sensor operably coupled to the fluid conduit to measure a temperature of the fuel;
   wherein the EEC system comprises:
      a processor; and
      a non-transitory computer readable storage medium in electronic communication with the processor, the non-transitory computer readable storage medium having instructions stored thereon that, in response to execution by the processor cause the processor to perform operations comprising:
  detecting, by the processor, a first temperature of the fuel flowing through the fluid conduit from the temperature sensor;
  determining, by the processor, a first density of the fuel at the first temperature from the densimeter;
  calculating, by the processor, a second density at a second temperature of the fuel; and
  commanding, by the processor, the fuel valve to meter the fuel flow to a fuel nozzle of the gas-turbine engine to a desired fuel flow rate based on the second density.

4. The engine control device of claim 3, wherein the operations further comprise detecting, by the processor, the second temperature of the fuel at the fuel valve.

5. The engine control device of claim 1, wherein the inlet port is disposed at a first end of the housing and the outlet port is disposed at a second end of the housing.

6. A fuel flow control system for a gas turbine engine, the fuel flow control system comprising:
  a fuel supply;
  a fluid conduit in fluid communication with the fuel supply, the fuel supply configured to supply a fuel through the fluid conduit to cool an electronic engine control (EEC) system for the gas turbine engine;
  an engine control device in fluid communication with the fuel supply, the engine control device defining a housing, the EEC system disposed within the housing of the engine control device, the fluid conduit defining an inlet port and an outlet port in the housing;
  a densimeter operably coupled to the fluid conduit, the densimeter embedded within the housing of the engine control device, the densimeter configured to determine a first density of the fuel;
  a first temperature sensor operably coupled to the fluid conduit, the first temperature sensor configured to measure a first temperature of the fuel;
  a fuel nozzle in fluid communication with the fuel supply; and
  a second temperature sensor disposed between the fuel nozzle and the fuel supply, the second temperature sensor configured to measure a second temperature of the fuel, wherein the EEC system is configured to control a flow rate to the fuel nozzle via a fuel valve based on calculating a second density of the fuel proximal the fuel nozzle from the first density, the first temperature and the second temperature.

7. The fuel flow control system of claim 6, wherein the fluid conduit is disposed through the housing of the engine control device.

8. The fuel flow control system of claim 6, wherein the fuel from the fuel supply is configured to cool the engine control device during operation of the gas turbine engine.

9. A method of controlling a fuel flow in a gas turbine engine, the method comprising:
  measuring a first fuel temperature of a fuel at a first location, the first location is within an engine control device having an electronic engine control (EEC) system disposed in a housing of the engine control device, the EEC system configured to control a flow rate in response to commanding a fuel valve assembly;
  measuring, via a densimeter embedded within the housing, a first density of the fuel proximate the first location within the housing between an inlet port and an outlet port of a fluid conduit supplying the fuel through the housing of the engine control device;
  measuring a second fuel temperature of the fuel at a second location;
  calculating a second density of the fuel at the second location based on the second fuel temperature, the first fuel temperature, and the first density of the fuel; and
  metering the fuel flow via the fuel valve assembly to a desired fuel flow rate at the second location based on the second density of the fuel.

10. The method of claim 9, wherein the fuel valve assembly is disposed proximate a fuel nozzle of the gas turbine engine.

11. The method of claim 9, further comprising cooling the EEC system in response to the fuel flowing through the engine control device.

* * * * *